(12) United States Patent
Sharman et al.

(10) Patent No.: US 11,558,609 B2
(45) Date of Patent: Jan. 17, 2023

(54) IMAGE DATA ENCODING AND DECODING

(71) Applicant: SONY CORPORATION, Tokyo (JP)

(72) Inventors: Karl James Sharman, Newbury (GB); Stephen Mark Keating, Reading (GB)

(73) Assignee: SONY CORPORATION, Tokyo (JP)

(*) Notice: Subject to any disclaimer, the term of this patent is extended or adjusted under 35 U.S.C. 154(b) by 20 days.

(21) Appl. No.: 17/276,328

(22) PCT Filed: Aug. 27, 2019

(86) PCT No.: PCT/GB2019/052391
§ 371 (c)(1),
(2) Date: Mar. 15, 2021

(87) PCT Pub. No.: WO2020/065255
PCT Pub. Date: Apr. 2, 2020

(65) Prior Publication Data
US 2022/0038690 A1    Feb. 3, 2022

(30) Foreign Application Priority Data
Sep. 24, 2018  (GB) ..................................... 1815556

(51) Int. Cl.
*H04N 19/11*    (2014.01)
*H04N 19/105*   (2014.01)
(Continued)

(52) U.S. Cl.
CPC ........... *H04N 19/11* (2014.11); *H04N 19/105* (2014.11); *H04N 19/109* (2014.11); *H04N 19/17* (2014.11); *H04N 19/96* (2014.11)

(58) Field of Classification Search
None
See application file for complete search history.

(56) References Cited

U.S. PATENT DOCUMENTS

2016/0241868 A1    8/2016  Li et al.
2017/0094271 A1    3/2017  Liu et al.
(Continued)

FOREIGN PATENT DOCUMENTS

EP        2 770 739 A1      8/2014
WO    WO 2015/054811 A1    4/2015
(Continued)

OTHER PUBLICATIONS

International Search Report dated Nov. 27, 2019 in PCT/GB2019/052391 filed on Aug. 27, 2019.
(Continued)

*Primary Examiner* — Kaitlin A Retallick
(74) *Attorney, Agent, or Firm* — Oblon, McClelland, Maier & Neustadt, L.L.P.

(57) ABSTRACT

An image encoding apparatus comprises a selector configured to select a prediction operation, for prediction of samples of a current region of a current image with respect to one or more of a group of reference samples, from a set of candidate prediction operations, at least some of which define, as an intra-image prediction operation, a prediction direction between a current sample to be predicted and a group of reference samples in the same image; and an intra-image predictor configured to derive predicted samples of a current image region from reference samples of the same image in response to selection, by the selector, of an intra-image prediction operation for the current image region; in which: the current region comprises at least a subset of a current coding tree unit (CTU) in an array of CTUs; the group of references samples is disposed, with respect to the current image region at one or more predetermined sides of the current image region; and the selector is configured to inhibit the selection of a prediction operation for the current region, for which at least some of the (Continued)

reference samples at one or more of the predetermined sides of the current image region are disposed in a CTU other than the current CTU.

14 Claims, 10 Drawing Sheets

(51) Int. Cl.
*H04N 19/109* (2014.01)
*H04N 19/17* (2014.01)
*H04N 19/96* (2014.01)

(56) References Cited

U.S. PATENT DOCUMENTS

| | | | |
|---|---|---|---|
| 2017/0134724 A1 | 5/2017 | Liu et al. | |
| 2019/0132596 A1 | 5/2019 | Sharman et al. | |
| 2019/0208199 A1* | 7/2019 | Cho | H04N 19/96 |

FOREIGN PATENT DOCUMENTS

| | | |
|---|---|---|
| WO | WO 2018/052224 A1 | 3/2018 |
| WO | WO 2019/007490 A1 | 1/2019 |

OTHER PUBLICATIONS

Boyce et al., "Draft high efficiency video coding (HEVC) version 2, combined format range extensions (RExt), scalability (SHVC), and multi-view (MV-HEVC) extensions", Joint Collaborative Team on Video Coding (JCT-VC) of ITU-T SG 16 WP 3 and ISO/IEC JTC 1/SC 29/WG 11, Draft ISO/IEC 23008-2:201x(E), Document: JCTVC-R1013_v6, 2014, 533 total pages.

Clare et al., "Wavefront Parallel Processing for HEVC Encoding and Decoding", 6. JCT-VC Meeting; 97, MPEG Meeting; Jul. 14, 2011-Jul. 22, 2011; Torino, Italy; (Joint Collaborative Team on Video Coding of ISO/IEC JTC1/SC29/WG11 and ITU-T SG.16); URL: http://wftp3.itu.int/av-arch/jctvc-site/, No. JCTVC-F274, Jan. 1, 2011, XP030009297, pp. 1-16.

* cited by examiner

| | | | | | |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

1300 (top-left), 1300 (bottom)

| | | | | | |
|---|---|---|---|---|---|
| 0 | 1 | 2 | 3 | 4 | 5 |
| 0 | 1 | 2 | 3 | 4 | 5 |
| 0 | 1 | 2 | 3 | 4 | 5 |
| 0 | 1 | 2 | 3 | 4 | 5 |

FIG. 14

IMAGE DATA ENCODING AND DECODING

FIELD OF THE DISCLOSURE

This disclosure relates to image data encoding and decoding.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

There are several video data compression and decompression systems which involve generating predicted samples and encoding so-called residual data representing a difference between the prediction and the input data.

Some standards and draft standards, such as the so-called High Efficiency Video Coding (HEVC) standards or the Joint Exploration Model (JEM) or Future Video Coding (FVC) proposals, define encoding and decoding systems applicable to the present disclosure.

SUMMARY

An aspect of this disclosure is defined by claim 1.

Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein:

FIG. 11 schematically illustrates a dependency between CTUs;

FIGS. 12 to 14 schematically illustrate respective decoding orders of CTUs;

DESCRIPTION OF THE EMBODIMENTS

Figure 1:
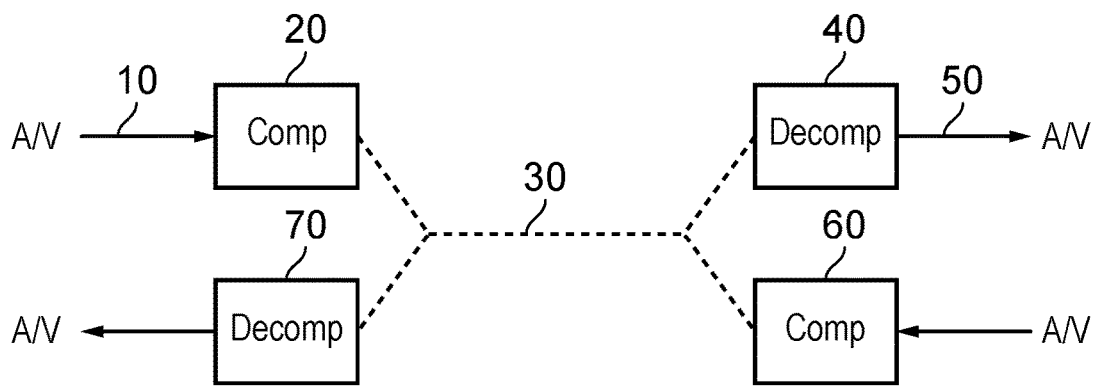
FIG. 1 schematically illustrates an audio/video (A/V) data transmission and reception system using video data compression and decompression.

Referring now to the drawings, FIGS. 1-4e are provided to give schematic illustrations of apparatus or systems making use of the compression and/or decompression apparatus to be described below in connection with embodiments.

All of the data compression and/or decompression apparatus is to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
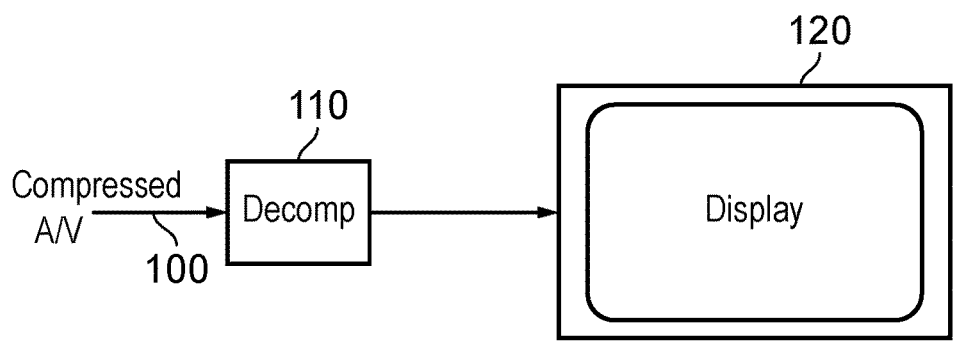
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 might be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
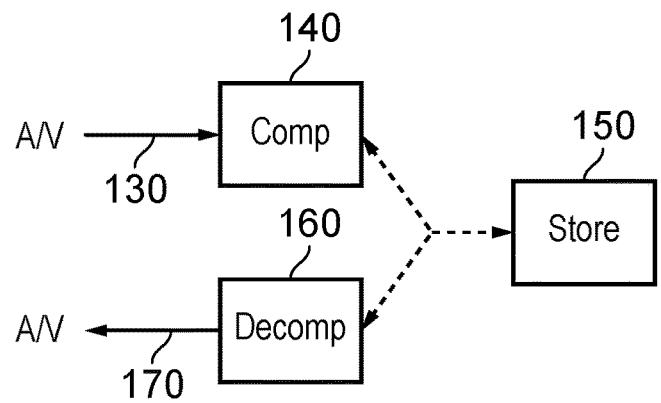
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium or data carrier storing that signal, are considered as embodiments. Reference is made to FIGS. 4d and 4e described below.

Figure 4A:
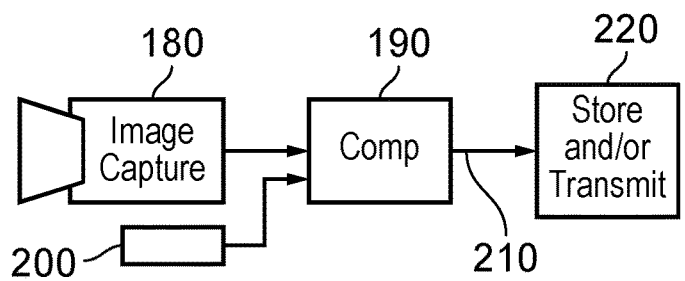
FIG. 4a schematically illustrates a video camera using video data compression.

FIG. 4a schematically illustrates a video camera using video data compression. In FIG. 4a, and image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4e) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 4B:
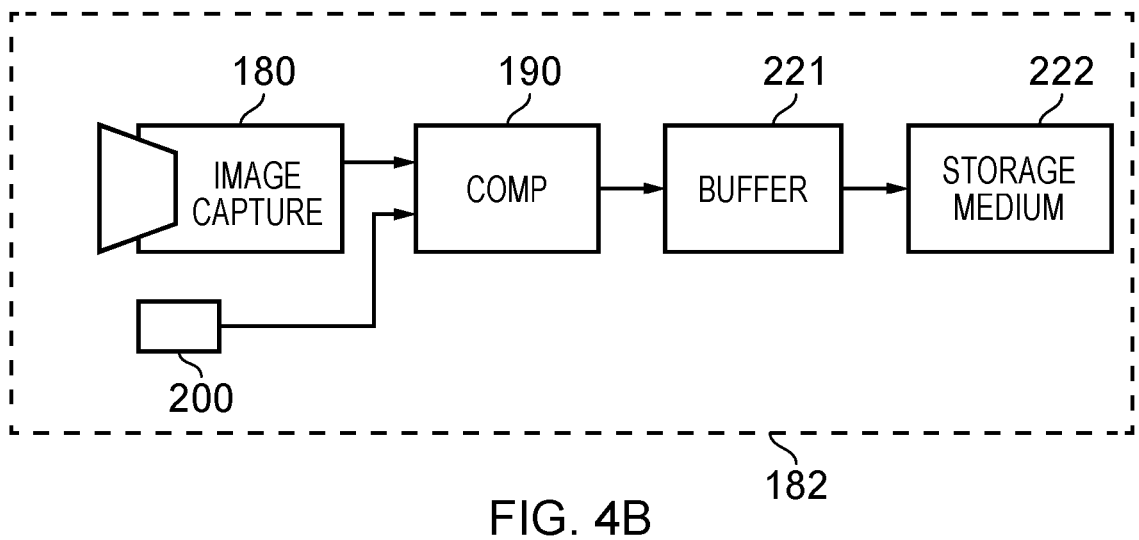
FIG. 4b schematically illustrates an example video camera in more detail.

FIG. 4b schematically illustrates an example video camera apparatus 183 in more detail. Those features numbered in common with FIG. 4a will not be described further. FIG. 4b is an example of the camera of FIG. 4a (in the case that the unit 220 of FIG. 4a provides a storage capability) in which the compressed data are first buffered by a buffer 221 and then stored in a storage medium 222 such as a magnetic disk, an optical disk, flash memory, a so-called solid-state disk drive (SSD) or the like. Note that the arrangement of FIG. 4b can be implemented as a single (physical) unit 182.

Figure 4C:
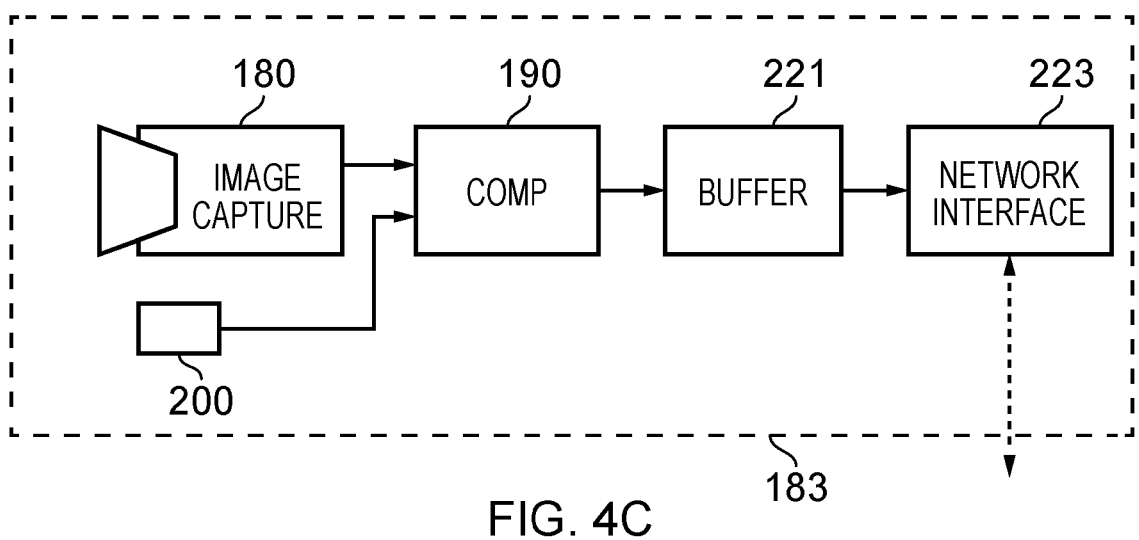
FIG. 4c schematically illustrates another example video camera.
Figure 4D:
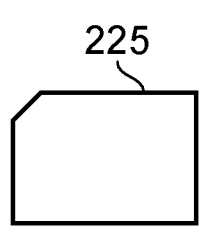
FIGS. 4d and 4e schematically illustrate data carriers.
Figure 4E:
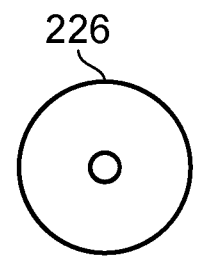

FIG. 4c schematically illustrates another example video camera in which, in place of the storage arrangement of FIG. 4b, a network interface 223 is provided in order to allow the compressed data to be transmitted to another unit (not shown). The network interface 223 can also allow for incoming data to be received by the video camera, such as control data. Note that the arrangement of FIG. 4b can be implemented as a single (physical) unit 183.

FIGS. 4d and 4e schematically illustrate data carriers, for example for use as the storage medium 222 and carrying compressed data which has been compressed according to the compression techniques described in the present application. FIG. 4d shows a schematic example of a removable non-volatile storage medium 225 implemented as solid state memory such as flash memory. FIG. 4e shows a schematic example of a removable non-volatile storage medium 226 implemented as a disk medium such as an optical disk.

Figure 5:
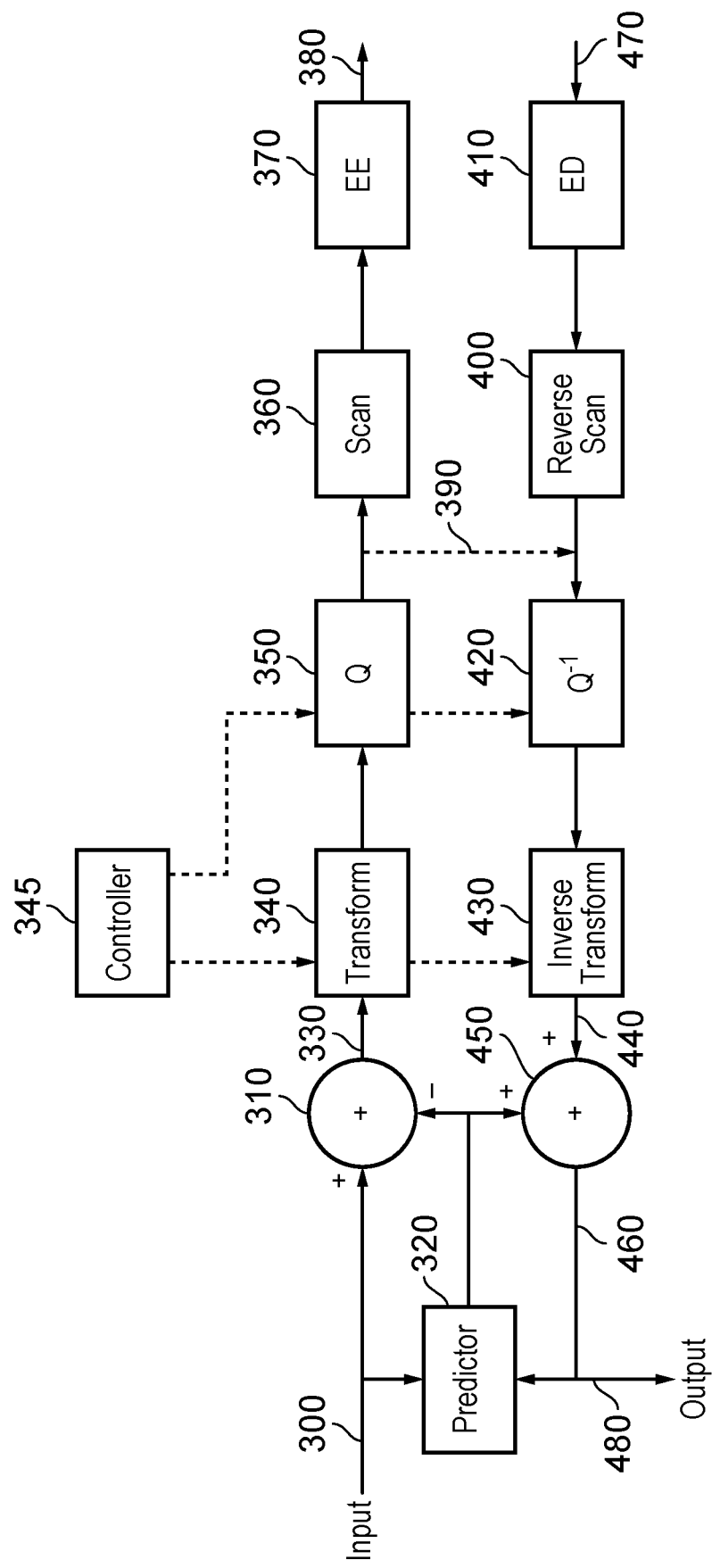
FIG. 5 provides a schematic overview of a video data compression and decompression apparatus.

FIG. 5 provides a schematic overview of a video data compression and decompression apparatus.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tends to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here.

Note that in some embodiments, a discrete sine transform (DST) is used instead of a DCT. In other embodiments, no transform might be used. This can be done selectively, so that the transform stage is, in effect, bypassed, for example under the control of a "transform-skip" command or mode.

The output of the transform unit 340, which is to say, a set of transform coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process work more efficiently in generating small amounts of compressed video data.

A controller 345 controls the operation of the transform unit 340 and the quantiser 350 (and their respective inverse units), according to techniques to be discussed further below. Note that the controller 345 may also control other aspects of the operation of the apparatus of FIG. 5 and indeed the operation of the apparatus of FIG. 6.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called zigzag scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC.

Note that the scanning process and the entropy encoding process are shown as separate processes, but in fact can be combined or treated together. That is to say, the reading of data into (or processing of data by) the entropy encoder can take place in the scan order. Corresponding considerations apply to the respective inverse processes.

The output of the entropy encoder 370, along with additional data, for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal corresponds to the return path of the compression process and so a decoding apparatus or method corresponds to the features or operation of the decoding path of the encoder described here.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320.

Turning now to the process applied to a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output.

Figure 6:
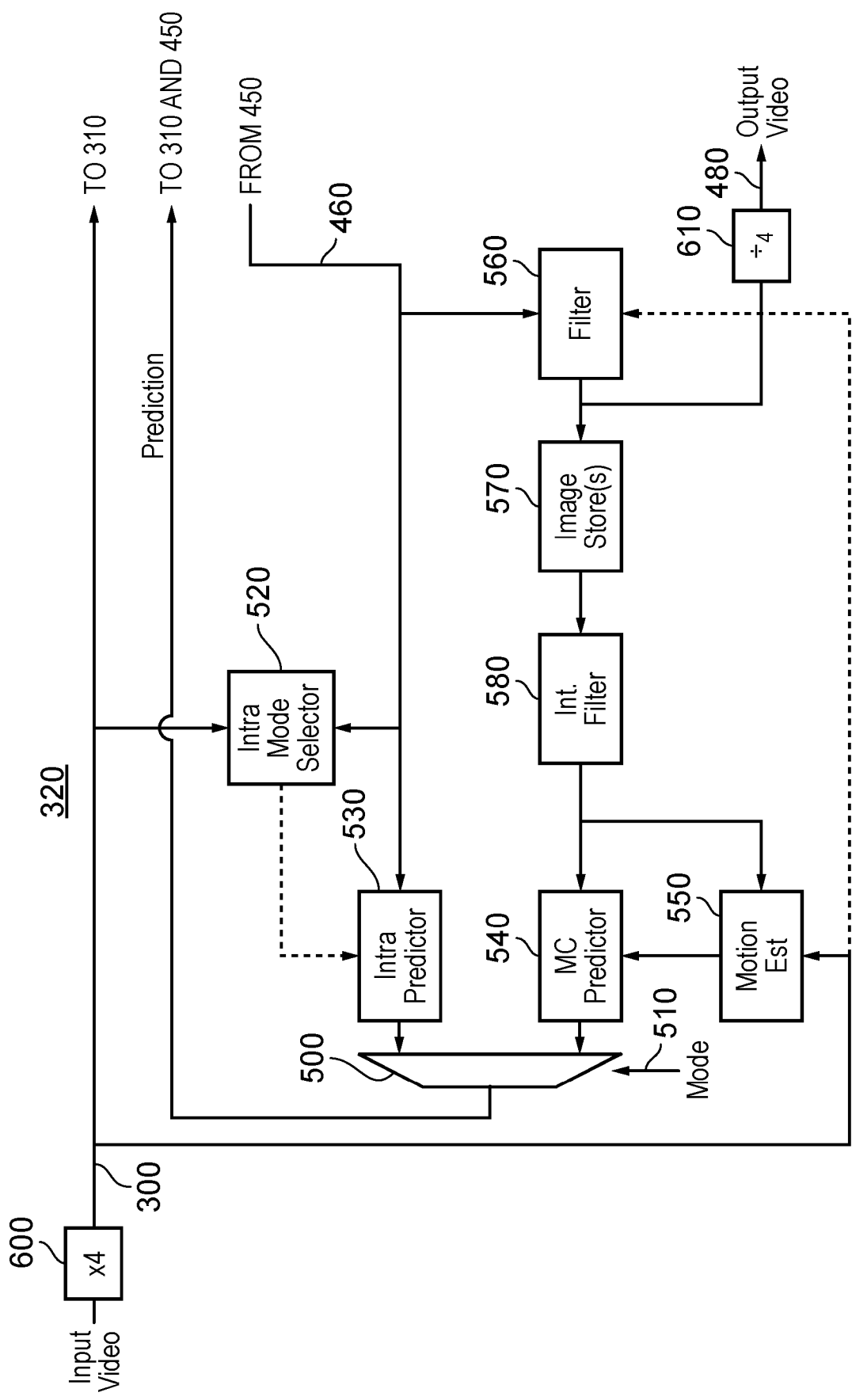
FIG. 6 schematically illustrates the generation of predicted images.

FIG. 6 schematically illustrates the generation of predicted images, and in particular the operation of the image predictor 320, under the control of the controller 345 (not itself shown in FIG. 6).

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments the choice is still made on an image-by-image basis.

Motion-compensated prediction makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output data stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

The processing applied to the signal 460 will now be described. Firstly, the signal is filtered by a filter unit 560. This involves applying a "deblocking" filter to remove or at least tend to reduce the effects of the block-based processing carried out by the transform unit 340 and subsequent operations. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data stream.

The filtered output from the filter unit 560 in fact forms the output video signal 480. It is also buffered in one or more image stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 8 times (in each dimension) that of the images stored in the image stores 570. The interpolated images are passed as an input to the motion estimator 550 and also to the motion compensated predictor 540.

In embodiments, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

Figure 7:
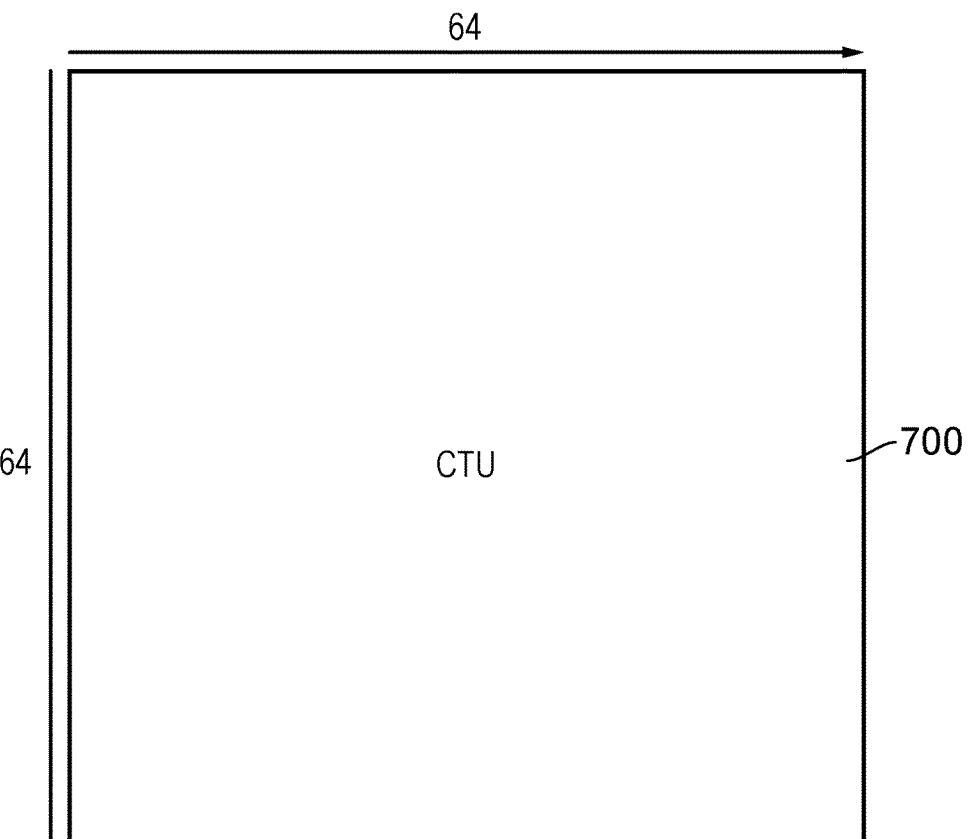
FIG. 7 schematically illustrates a largest coding unit (CTU)

The way in which an image is partitioned for compression processing will now be described. At a basic level, and image to be compressed is considered as an array of blocks of samples. For the purposes of the present discussion, the largest such block under consideration is a so-called coding tree unit (CTU) 700 (FIG. 7), which in this example represents a square array of 64×64 samples. Here, the discussion relates to luminance samples. Depending on the chrominance mode, such as 4:4:4, 4:2:2, 4:2:0 or 4:4:4:4 (GBR plus key data), there will be differing numbers of corresponding chrominance samples corresponding to the luminance block.

In general terms, the recursive subdividing of the CTUs allows an input picture to be partitioned in such a way that both the block sizes and the block coding parameters (such as prediction or residual coding modes) can be set according to the specific characteristics of the image to be encoded.

Figure 8:
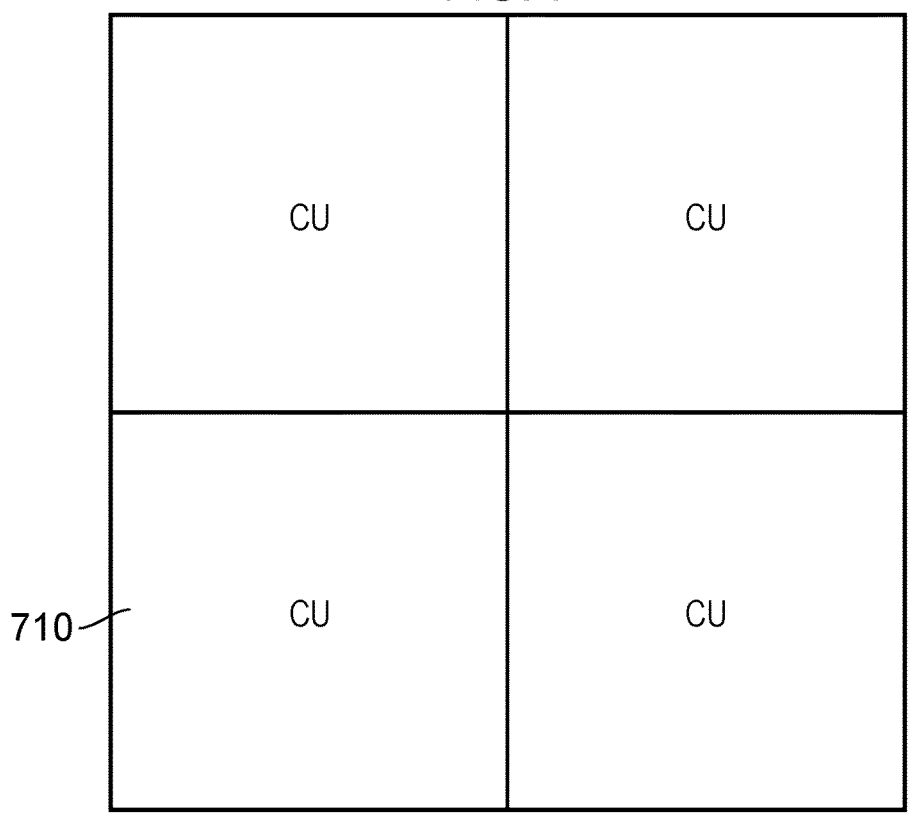
FIG. 8 schematically illustrates a set of four coding units (CU)
Figure 9:
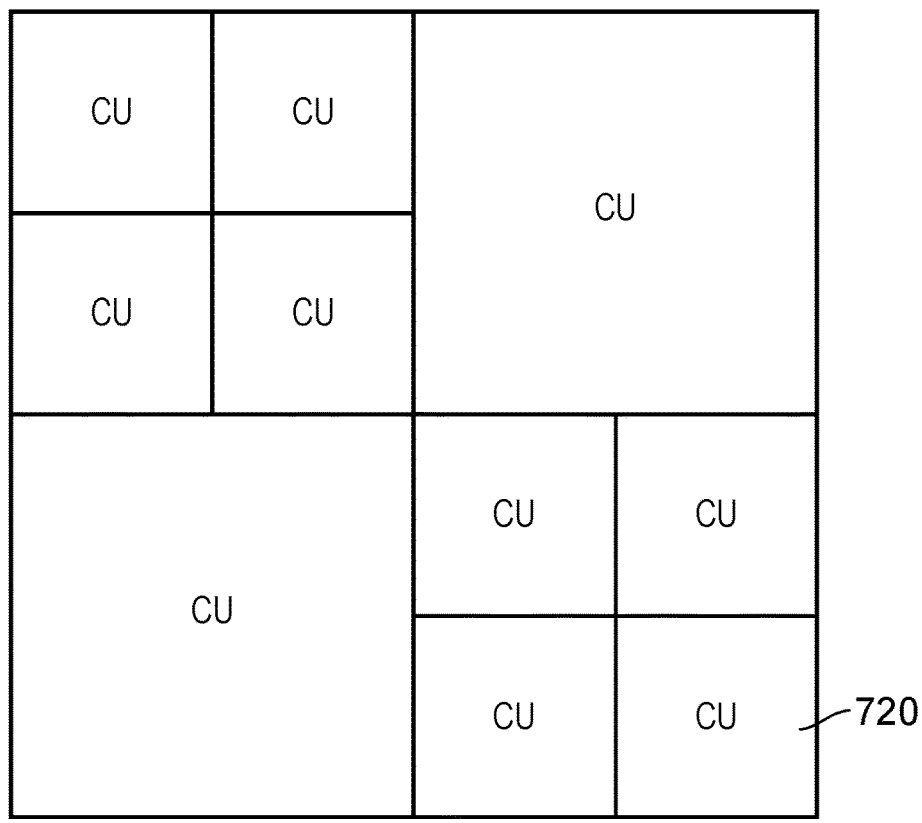
FIGS. 9 and 10 schematically illustrate the coding units of FIG. 8 sub-divided into smaller coding units.
Figure 10:
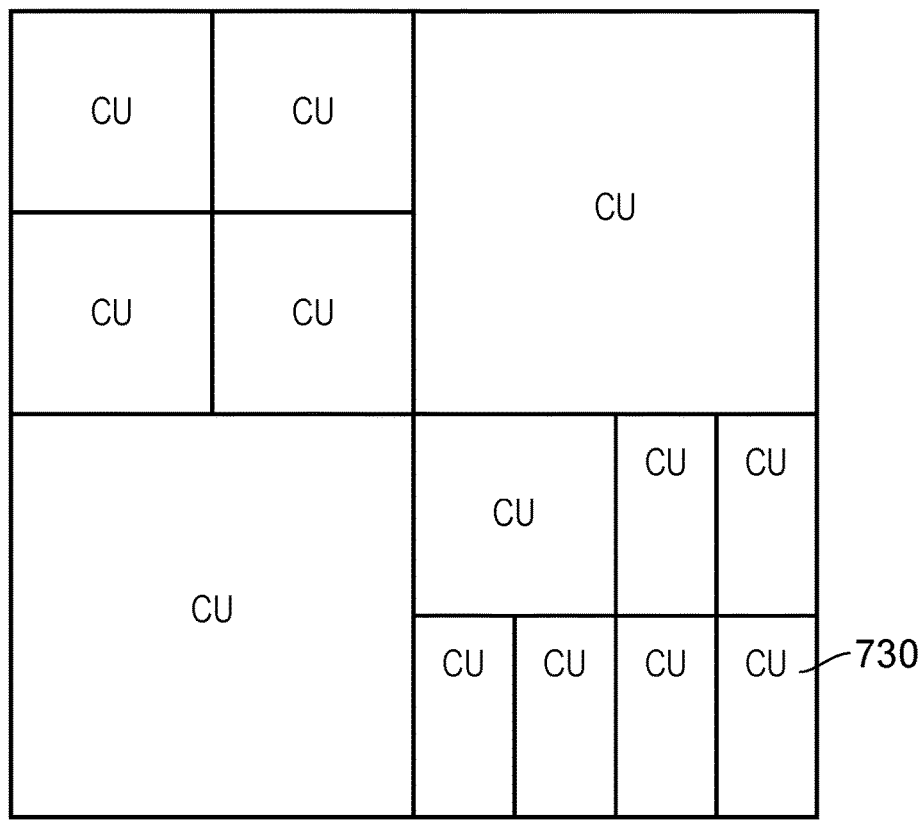

The CTU may be subdivided into so-called coding units (CU). Coding units may be square or rectangular and have a size between a minimum size (smaller than the CTU) and the full size of the CTU 700. The coding units can be arranged as a kind of tree structure, so that a first subdivision may take place as shown in FIG. 8, giving coding units 710 of 32×32 samples; subsequent subdivisions may then take place on a selective basis so as to give some coding units 720 of 16×16 samples (FIG. 9) and potentially some coding units 730 of 8×8 samples (FIG. 10). Overall, this process can provide a content-adapting coding tree structure of CU blocks, each of which may be as large as the CTU or as small as 8×8 samples. Encoding of the output video data takes place on the basis of the coding unit structure.

The CUs may also represent the minimum sub-division for prediction and transform, so that the CUs are also used as prediction units (PUs) and transform units (TUs), or in other examples a different or further sub-division into PUs and/or TUs may be performed.

At least parts of the entropy encoding operations carried out by the entropy encoder 370 can make use of so-called CABAC (context adaptive binary arithmetic coding) techniques. The CABAC context modelling and encoding process is described in more detail in "Draft high efficiency video coding (HEVC) version 2, combined format range extensions (RExt), scalability (SHVC), and multi-view (MV-HEVC) extensions", JCTVC-R1013_v6, Draft ISO/IEC 23008-HEVC; 201x(E)2014-10-01.

A significant feature of the CABAC system is that a particular CABAC bit stream has to be decoded by a single decoder. That is to say, the CABAC data for a particular individual bit stream is inherently serialised, because each encoded value depends on previously encoded values, and cannot be handled by multiple decoders in parallel. However, when decoding video at very high operating points (for example, high bit rates and/or high quality such as professional quality), the CABAC throughput requirement is such that it becomes difficult to implement an entropy-decoder capable of decoding the worst-case frame in a timely manner. With this and other similar throughput constraints in mind, parallel operation of data-processing systems such as HEVC video decoders has been proposed.

Various issues arise when parallel decoder operation is being contemplated. As discussed above, a particular bit stream should be decoded by a respective decoder. Techniques for addressing these requirements will now be described.

Figures 11, 12:
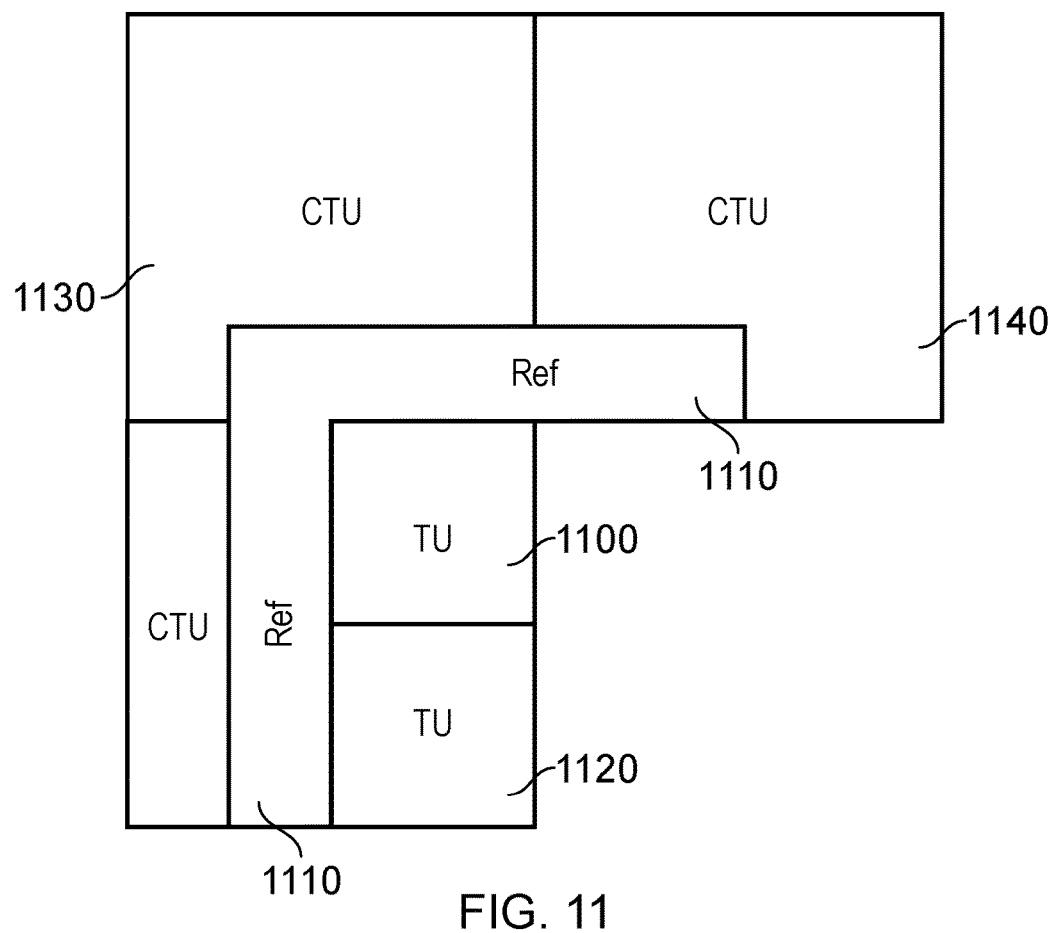

Referring to FIG. 11, the CTUs are encoded in a CTU order from top left to lower right of the image. Clearly, this is just an example order and a different order could be used, but here it illustrates an order of dependency in that in an intra-image prediction arrangement, a particular transform unit (TU) 1100, which is predicted using reference samples 1110 above and to the left of the TU 1100, may require the use of reference samples from one or more neighbouring and previously encoded (and decoded) CTUs. In the example of FIG. 11, the TU 1100, being at an upper edge of a CTU 1120, relies upon reference to samples from neighbouring CTUs 1130, 1140. Similarly, if a TU is at the extreme left edge of a CTU, the TU can rely upon reference samples from a CTU to the left of the current CTU. This provides an example in which a group of references samples is disposed, with respect to the current image region above and to the left of the current image region. In examples, the group of reference samples comprises one or more linear arrays of reference samples disposed with respect to the current region, the intra-image predictor being configured to derive the predicted samples in dependence upon reference samples of the one or more linear arrays pointed to by the prediction direction.

This potential dependency between CTUs imposes a decoding order for CTUs shown schematically in FIG. 12. Here, a top left CTU 1200 is decoded first, followed by a CTU 1210 next to the right of the CTU 1200. After that, a next CTU 1220 in the top row can be decoded, but also taking into account the dependency of the type shown in FIG. 11, a first CTU 1230 of a second row can be decoded. The decoding can proceed, CTU by CTU, in the order indicated by the numbers drawn within each box (representing a respective CTU) in FIG. 12. By looking at the numbers indicating the order of decoding in FIG. 12, it can be seen that this arrangement can be referred to as a so-called wavefront system, in which each row can start decoding once the left hand two CTUs of the row above have been completed.

With regards to the so-called wavefront system, any advantage which it brings tends to decrease as the CTU size increases. Also, the degree of parallelism of the wavefront arrangement is dependent only upon the height of the picture not the width. In particular, the parallelism offered by this system therefore tends to increase with the square root of the number of pixels, rather than with the number of pixels itself.

Figures 13, 14:
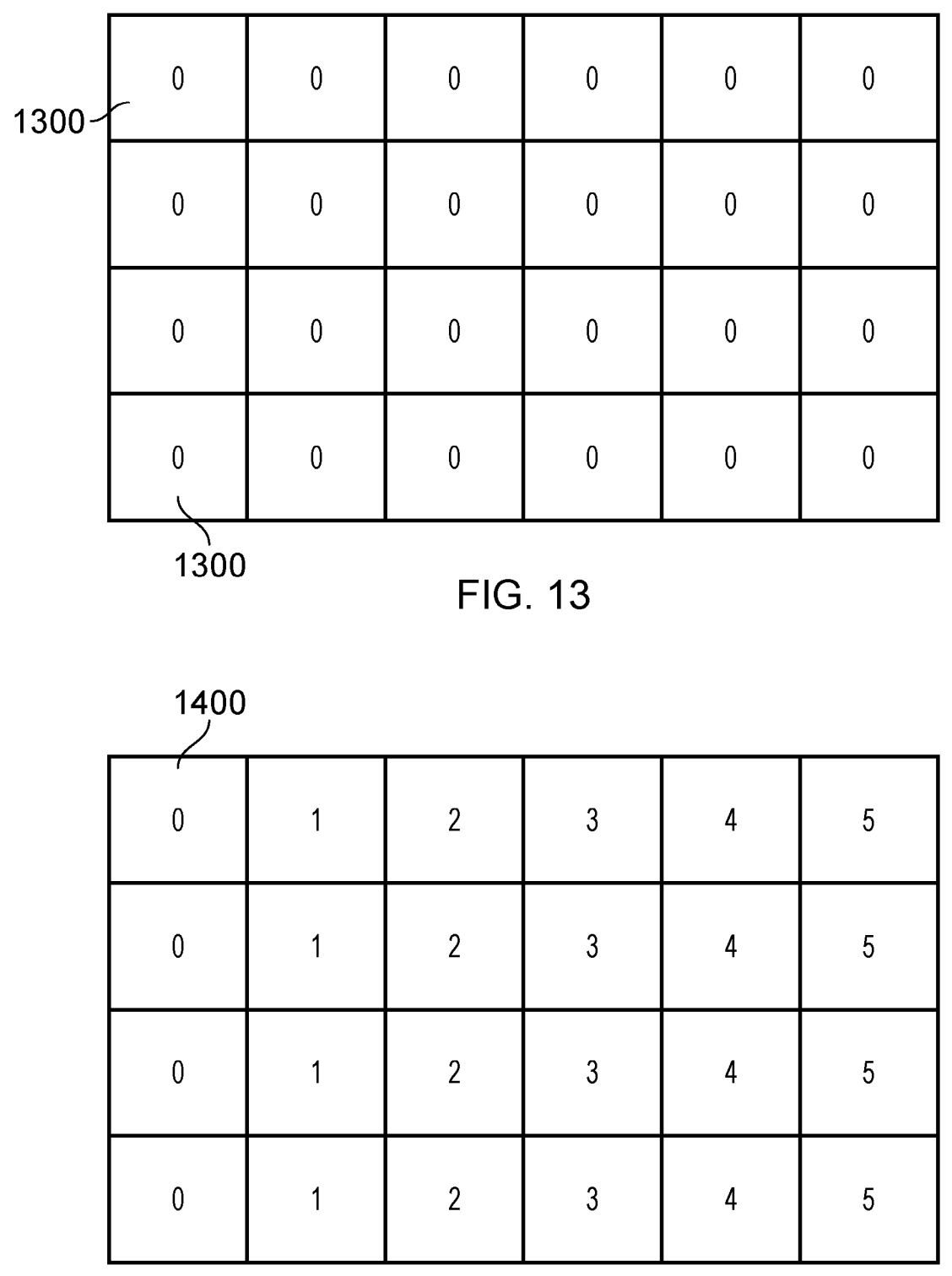

With regard to FIG. 13, a different example arrangement is shown in which a restriction is included with regards to intra-image prediction, such that the use of reference samples from neighbouring CTUs is disallowed altogether. This means that no CTU has a dependency, from the point of intra-image prediction, on any other CTU. This leads to a potential decoding order shown schematically in FIG. 13, in which all of the CTUs 1300 can potentially be decoded in parallel. Such an arrangement only impacts TUs at the top and/or left of a CTU, so that for larger CTUs, the impact is reduced because the proportion of TUs at the top and/or left will be lower for a larger CTU. In this arrangement, all CTUs can be decoded in parallel, although as mentioned there is no requirement that they all be coded in parallel, there is simply no dependency amongst them to prevent such decoding. However, by preventing these of neighbouring reference samples there will be a potential loss of coding efficiency, at least for the top/left TUs of a CTU, because reference samples which might otherwise have been relevant to an efficient prediction are not allowed to be used.

This discussion of FIG. 13 provides an example in which a prediction mode selector is configured to inhibit the selection of a prediction operation for the current region, for which at least some of the reference samples are disposed in a CTU above the current CTU.

In another alternative arrangement, the restriction mentioned above is amended so that reference samples from a CTU to the left of the current CTU can be used for intra-image prediction, but reference samples above and above right of the current CTU cannot be used. This leads to a potential decoding order shown schematically in FIG. 14 in which decoding can take place on a column-by-column basis amongst the CTUs 1400. Once again, there is a potential increase in parallelism at decoding, compared to FIG. 12, but a potential decrease in coding efficiency because reference samples (which might otherwise have been relevant) are not used.

This discussion of FIG. 14 provides an example in which a prediction mode selector is configured to inhibit the selection of a prediction operation for the current region, for which at least some of the reference samples are disposed in a CTU to the left of the current CTU.

The use of above and left reference samples from other CTUs can be inhibited, for example in an arrangement in which the prediction mode selector is configured to inhibit the selection of a prediction operation for the current region, for which at least some of the reference samples are disposed either in a CTU above the current CTU or a CTU to the left of the current CTU.

Figures 15, 16:
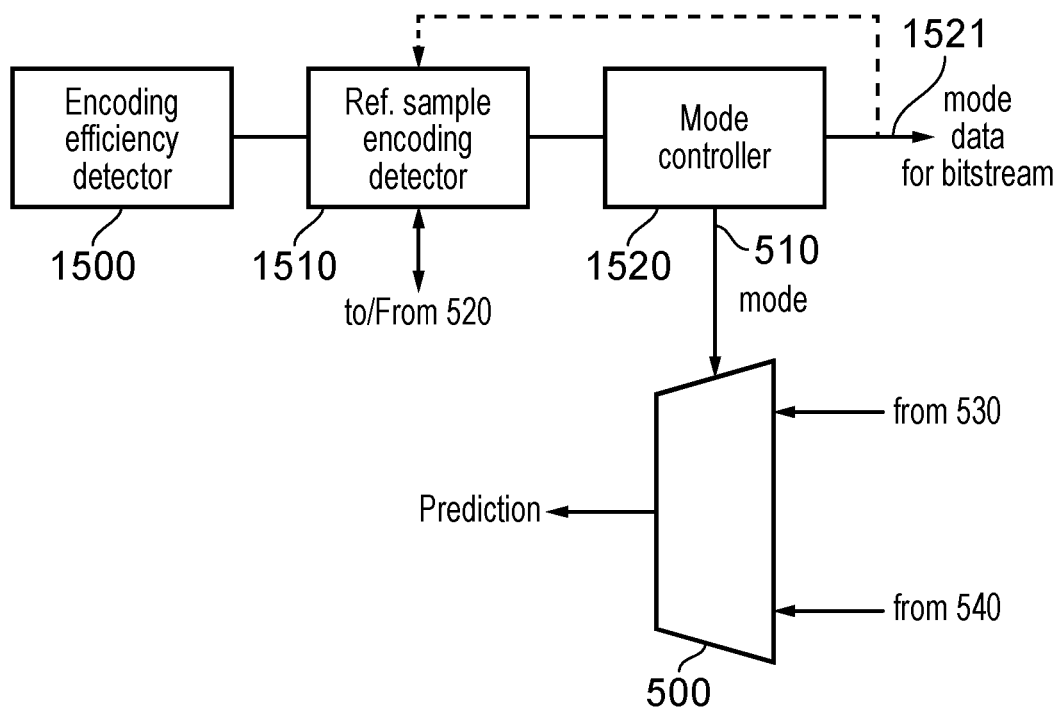
FIG. 15 schematically illustrates a variation of the arrangement of FIG. 6.
FIG. 16 schematically illustrates a decoding order of CTUs.

FIG. 15 schematically illustrates a variation of the arrangement of FIG. 6, in particular relating to the manner by which a choice is made between intra-image prediction and inter-image prediction.

An encoding efficiency detector 1500 operates to make a basic choice as between intra-image and inter-image prediction, using conventional techniques, for example by detecting one or more metrics indicating a quantity of encoded data which would arise if each candidate technique were used and selecting the candidate technique:

inter-image prediction using the currently selected motion vector chosen by the motion estimator 550; or intra-image prediction using the mode currently selected by the intra-mode selector 520 in dependence upon the metric indicating the lower quantity of encoded data.

However, as part of the function of the prediction operation selector, further circuitry or modules 1510, 1520 are provided.

In particular, a reference sample encoding detector 1510, responsive to the currently selected prediction mode from the intra mode selector 520 detects the type of encoding used in respect of reference samples required by the currently selected intra mode, at least in instances where the reference samples (or at least some of the reference samples) applicable to that mode are located in a neighbouring CTU. If those reference samples in a neighbouring CTU were intra-image encoded then, for the current TU, a mode controller 1520 inhibits (or in some examples prevents) the use of intra-image mode provisionally selected by the intra selector 520 and forces the use of inter-image encoding. In an alternative arrangement, intra-image encoding could still be allowed, but a different intra-image mode could be enabled, being one in which reference samples from that neighbouring CTU are not used. In other words, the restriction does not prevent the use of (say) a 45 degree prediction when (say) the above row is unavailable. In those example cases the top row of reference samples could be replaced with other values that can be derived from the left row of reference samples. Or in another arrangement a dc or planar mode could be used instead.

The mode controller 1520 can also act as a generator configured to generate indicator data 1521, for provision to an image data decoder (for example as part of or otherwise in association with the encoded data stream), indicating the prediction mode selected by the selector.

So, neighbouring CTU samples can be used as references if they themselves were obtained by inter-image encoding, which does not have the same dependency ordering within a particular image. This represents a restriction in intra-prediction, such that the use of neighbouring reference samples which themselves were intra-predicted is disallowed when they are from neighbouring CTUs. This therefore allows the intra prediction process to be performed in parallel at CTU level, as there is no dependency on other intra predicted blocks outside the current CTU. It can also reduce the loss of coding efficiency as opposed to other techniques discussed above, since more reference data is potentially available, for example neighbouring inter-predicted samples.

This provides an example of inhibiting the selection of an intra-image prediction operation for the current region for which at least some of the reference samples at one or more of the predetermined sides of the current image region are disposed in a CTU other than the current CTU and those reference samples were generated using an intra-image prediction mode; and allowing the selection of an intra-image prediction operation for the current region for which at least some of the reference samples at one or more of the predetermined sides of the current image region are disposed in a CTU other than the current CTU and those reference samples were generated using an inter-image prediction mode.

The apparatus of FIG. 5, when operating in accordance with these principles and potentially using the apparatus of FIG. 15, provides an example of an image encoding apparatus (FIG. 5) comprising: a selector (FIG. 15) configured to select a prediction operation, for prediction of samples of a current region of a current image with respect to one or more of a group of reference samples, from a set of candidate prediction operations, at least some of which define, as an intra-image prediction operation, a prediction direction between a current sample to be predicted and a group of reference samples in the same image; and an intra-image predictor 530 configured to derive predicted samples of a current image region from reference samples of the same image in response to selection, by the selector, of an intra-image prediction operation for the current image region; in which: the current region comprises at least a subset of a current coding tree unit (CTU) in an array of CTUs; the group of references samples is disposed, with respect to the current image region at one or more predetermined sides of the current image region; and the selector is configured to inhibit the selection of a prediction operation for the current region, for which at least some of the reference samples at one or more of the predetermined sides of the current image region are disposed in a CTU other than the current CTU.

Referring back to FIG. 6, in an example in which the current image is an image of a sequence of images; the apparatus can comprise an inter-image predictor 540 configured to predict samples of the current image region, with respect to a reference image region of another, reference, image of the sequence of images, according to a direction vector indicating a spatial displacement of the reference image region from the current image region. Here, a set of candidate prediction operations can comprise an inter-image prediction operation.

FIG. 16 schematically illustrates a potential decoding order of CTUs encoded using the techniques of FIG. 15, showing that all of the CTUs 1600 can potentially be encoded or decoded in parallel.

Figure 17:
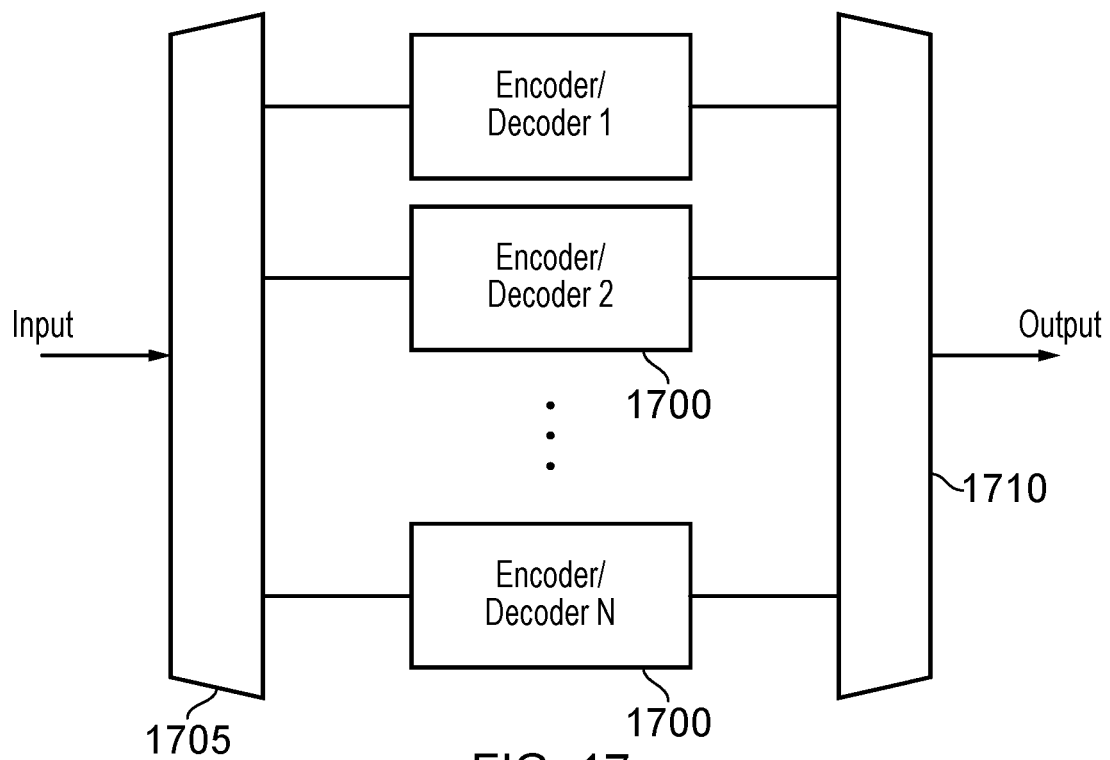
FIG. 17 schematically illustrates a parallel encoding and/or decoding apparatus.

FIG. 17 schematically illustrates a parallel encoding and/or decoding apparatus operating according to any one of the restrictions discussed above, in which input data (image data to be encoded in the case of an encoder or encoded image data to be decoded, in the case of a decoder) is demultiplexed by a demultiplexer 1705 to multiple encoder and/or decoder units 1700 for encoding or decoding in parallel, with the results being multiplexed by a multiplexer 1710 back into an output signal (encoded data in the case of an encoder or decoded data in the case of a decoder).

The interaction between the techniques discussed above and the so-called "constrained intra" technique will now be discussed. The constrained intra mode is provided within the standards and proposals to allow, for example, the image to be refreshed periodically even if an entire intra-encoded image (an "I frame" in MPEG terminology) is not being provided. In the constrained intra mode, at least portions of the image are constrained so that they may only be derived from other samples which have themselves been intra-image encoded or encoded using intra-block-copy processing. In this way, the constrained intra mode prevents (for example, over the course of several images) erroneous data from previously processed images being propagated into subsequent images by virtue of inter-image processing. In the constrained intra mode, therefore, a source block containing reference samples for a current block must itself have been intra-image encoded and/or encoded using intra-block-copy processing.

However, constrained intra operation is not concerned with CTU boundaries. The constrained intra rule (when applied) is applied equally to all blocks in a CTU.

The present techniques of FIG. 15 involve an inhibition on the use of intra modes for which the reference samples span CTUs, but do not necessarily impose a requirement that inter-image encoding is used for those blocks. Therefore, the constrained intra mode of operation can still be used in combination with these techniques.

Figure 18:
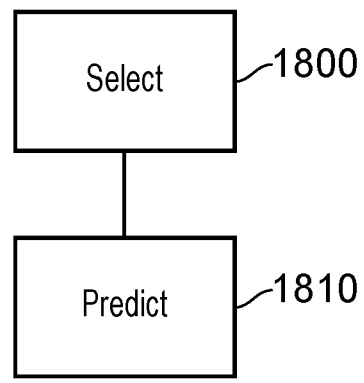
FIG. 18 is a schematic flowchart illustrating a method.

FIG. 18 is a schematic flowchart illustrating an image encoding method comprising:

selecting (at a step 1800) a prediction operation, for prediction of samples of a current region of a current image with respect to one or more of a group of reference samples, from a set of candidate prediction operations, at least some of which define, as an intra-image prediction operation, a prediction direction between a current sample to be predicted and a group of reference samples in the same image; and predicting (at a step 1810) samples of a current image region from reference samples of the same image in response to selection of an intra-image prediction operation selected for that current image region;

in which:

the current region comprises at least a subset of a current coding tree unit (CTU) in an array of CTUs;

the group of references samples is disposed, with respect to the current image region at one or more predetermined sides of the current image region; and the selecting step comprises inhibiting the selection of a prediction operation for the current region, for which at least some of the reference samples at one or more of the predetermined sides of the current image region are disposed in a CTU other than the current CTU.

Data Signals

Figure 19:
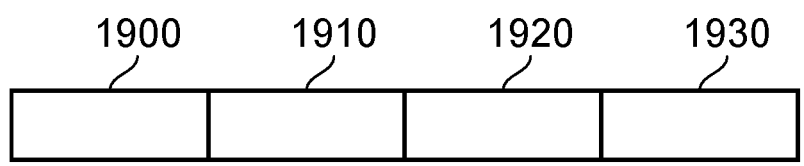
FIG. 19 schematically illustrates a data signal.

It will be appreciated that data signals generated by the variants of coding apparatus discussed above, and storage or transmission media carrying such signals, are considered to represent embodiments of the present disclosure. For example, FIG. 19 schematically represents a data signal comprising coded data generated according to the method of FIG. 18, the coded data comprising a succession of data portions 1900 . . . 1930 each representing a CTU and each being decodable without reference to a data portion representing a different CTU. The data portions 1900 . . . 1930 are represented schematically one next to another but it will be appreciated that this does not imply that they are or need to be generated serially, nor does this representation imply that they are or need to be transmitted or stored serially.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

For example, although the discussion above relates to one image decoder (with four portion decoders), this system could be extended for example so that two (or more) image decoders (for example, previewing two or more video streams in a non-linear editor) can share resources between eight portion decoders, and so on.

Further respective features of the present disclosure are defined by the following numbered clauses:

1. An image encoding apparatus comprising:
    a selector configured to select a prediction operation, for prediction of samples of a current region of a current image with respect to one or more of a group of reference samples, from a set of candidate prediction operations, at least some of which define, as an intra-image prediction operation, a prediction direction between a current sample to be predicted and a group of reference samples in the same image; and
    an intra-image predictor configured to derive predicted samples of a current image region from reference samples of the same image in response to selection, by the selector, of an intra-image prediction operation for the current image region;
    in which:
    the current region comprises at least a subset of a current coding tree unit (CTU) in an array of CTUs;
    the group of references samples is disposed, with respect to the current image region at one or more predetermined sides of the current image region; and
    the selector is configured to inhibit the selection of a prediction operation for the current region, for which at least some of the reference samples at one or more of the predetermined sides of the current image region are disposed in a CTU other than the current CTU.
2. Apparatus according to clause 1, in which the group of references samples is disposed, with respect to the current image region above and to the left of the current image region.
3. Apparatus according to clause 2, in which the selector is configured to inhibit the selection of a prediction operation for the current region, for which at least some of the reference samples are disposed in a CTU above the current CTU.
4. Apparatus according to clause 2, in which the selector is configured to inhibit the selection of a prediction operation for the current region, for which at least some of the reference samples are disposed in a CTU to the left of the current CTU.
5. Apparatus according to clause 2, in which the selector is configured to inhibit the selection of a prediction operation for the current region, for which at least some of the reference samples are either disposed in a CTU above the current CTU or a CTU to the left of the current CTU.
6. Apparatus according to any one of the preceding clauses, in which the current image is an image of a sequence of images;
    the apparatus comprising an inter-image predictor configured to predict samples of the current image region, with respect to a reference image region of another, reference, image of the sequence of images, according to a direction vector indicating a spatial displacement of the reference image region from the current image region.
7. Apparatus according to clause 6, in which the set of candidate prediction operations comprises an inter-image prediction operation.
8. Apparatus according to clause 7, in which the selector is configured:
    to inhibit the selection of an intra-image prediction operation for the current region for which at least some of the reference samples at one or more of the predetermined sides of the current image region are disposed in a CTU other than the current CTU and those reference samples were generated using an intra-image prediction mode; and
    to allow the selection of an intra-image prediction operation for the current region for which at least some of the reference samples at one or more of the predetermined sides of the current image region are disposed in a CTU other than the current CTU and those reference samples were generated using an inter-image prediction mode.
9. Apparatus according to any one of the preceding clauses, in which for at least some of the candidate prediction operations:
    the group of reference samples comprises one or more linear arrays of reference samples disposed with respect to the current region, the intra-image predictor being configured to derive the predicted samples in dependence upon reference samples of the one or more linear arrays pointed to by the prediction direction.
10. Apparatus according to any one of the preceding clauses, comprising a generator configured to generate indicator data, for provision to an image data decoder, indicating the prediction mode selected by the selector.
11. Video storage, capture, transmission or reception apparatus comprising apparatus according to any one of the preceding clauses.
12. An image encoding method comprising:
    selecting a prediction operation, for prediction of samples of a current region of a current image with respect to one or more of a group of reference samples, from a set of candidate prediction operations, at least some of which define, as an intra-image prediction operation, a prediction direction between a current sample to be predicted and a group of reference samples in the same image; and
    predicting samples of a current image region from reference samples of the same image in response to selection of an intra-image prediction operation selected for that current image region;

in which:
the current region comprises at least a subset of a current coding tree unit (CTU) in an array of CTUs;
the group of references samples is disposed, with respect to the current image region at one or more predetermined sides of the current image region; and
the selecting step comprises inhibiting the selection of a prediction operation for the current region, for which at least some of the reference samples at one or more of the predetermined sides of the current image region are disposed in a CTU other than the current CTU 13. Computer software which, when executed by a computer, causes the computer to carry out a method according to clause 12.
14. A machine-readable non-transitory storage medium which stores software according to clause 13.
15. A data signal comprising coded data generated according to the method of clause 13, the coded data comprising a succession of data portions each representing a CTU and each being decodable without reference to a data portion representing a different CTU.

The invention claimed is:

1. An image encoding apparatus comprising:
selector circuitry configured to select a prediction operation, for prediction of samples of a current region of a current image with respect to one or more of a group of reference samples, from a set of candidate prediction operations, at least some of which define, as an intra-image prediction operation, a prediction direction between a current sample to be predicted and a group of reference samples in the same image; and
an intra-image predictor configured to derive predicted samples of a current image region from reference samples of the same image in response to selection, by the selector circuitry, of an intra-image prediction operation for the current image region;
in which:
the current region comprises at least a subset of a current coding tree unit (CTU) in an array of CTUs;
the group of references samples is disposed, with respect to the current image region at one or more predetermined sides of the current image region; and
the selector circuitry is configured to inhibit the selection of a prediction operation for the current region, for which at least some of the reference samples at one or more of the predetermined sides of the current image region are disposed in a CTU other than the current CTU,
wherein the current image is an image of a sequence of images,
wherein the apparatus further comprises an inter-image predictor configured to predict samples of the current image region, with respect to a reference image region of another reference image of the sequence of images according to a direction vector indicating a spatial displacement of the reference image region from the current image region,
wherein the set of candidate prediction operations comprises an inter-image prediction operation, and
wherein the selector circuitry is configured to:
inhibit the selection of an intra-image prediction operation for the current region for which at least some of the reference samples at one or more of the predetermined sides of the current image region are disposed in a CTU other than the current CTU and those reference samples were generated using an intra-image prediction mode, and
allow the selection of an intra-image prediction operation for the current region for which at least some of the reference samples at one or more of the predetermined sides of the current image region are disposed in a CTU other than the current CTU and those reference samples were generated using an inter-image prediction mode.

2. The apparatus according to claim 1, wherein the group of references samples is disposed, with respect to the current image region above and to the left of the current image region.

3. The apparatus according to claim 2, wherein the selector circuitry is configured to inhibit the selection of a prediction operation for the current region, for which at least some of the reference samples are disposed in a CTU above the current CTU.

4. The apparatus according to claim 2, wherein the selector circuitry is configured to inhibit the selection of a prediction operation for the current region, for which at least some of the reference samples are disposed in a CTU to the left of the current CTU.

5. The apparatus according to claim 2, wherein the selector circuitry is configured to inhibit the selection of a prediction operation for the current region, for which at least some of the reference samples are disposed either in a CTU above the current CTU or a CTU to the left of the current CTU.

6. The apparatus according to claim 1, wherein for at least some of the candidate prediction operations:
the group of reference samples comprises one or more linear arrays of reference samples disposed with respect to the current region, the intra-image predictor being configured to derive the predicted samples in dependence upon reference samples of the one or more linear arrays pointed to by the prediction direction.

7. The apparatus according to claim 1, further comprising a generator configured to generate indicator data, for provision to an image data decoder, indicating the prediction mode selected by the selector circuitry.

8. A video storage, capture, transmission or reception apparatus comprising apparatus according to claim 1.

9. An image encoding method comprising:
selecting a prediction operation, for prediction of samples of a current region of a current image with respect to one or more of a group of reference samples, from a set of candidate prediction operations, at least some of which define, as an intra-image prediction operation, a prediction direction between a current sample to be predicted and a group of reference samples in the same image; and
predicting samples of a current image region from reference samples of the same image in response to selection of an intra-image prediction operation selected for that current image region;
in which:
the current region comprises at least a subset of a current coding tree unit (CTU) in an array of CTUs;
the group of references samples is disposed, with respect to the current image region at one or more predetermined sides of the current image region; and
the selecting comprises inhibiting, by circuitry the selection of a prediction operation for the current region, for which at least some of the reference samples at one or more of the predetermined sides of the current image region are disposed in a CTU other than the current CTU, wherein the current image is an image of a sequence of images, wherein the set of candidate prediction operations comprises an inter-image prediction operation, wherein the method further comprises:

predicting samples of the current image region, with respect to a reference image region of another reference image of the sequence of images according to a direction vector indicating a spatial displacement of the reference image region from the current image region, inhibiting the selection of an intra-image prediction operation for the current region for which at least some of the reference samples at one or more of the predetermined sides of the current image region are disposed in a CTU other than the current CTU and those reference samples were generated using an intra-image prediction mode, and allowing the selection of an intra-image prediction operation for the current region for which at least some of the reference samples at one or more of the predetermined sides of the current image region are disposed in a CTU other than the current CTU and those reference samples were generated using an inter-image prediction mode.

10. A machine-readable non-transitory storage medium having stored thereon code components which, when executed by a computer, perform the method according to claim 9.

11. A decoding apparatus comprising:
circuitry configured to implement parallel computing processing to decode image data generated by the image encoding apparatus as claimed in claim 1.

12. A decoding method comprising:
implementing parallel computing processing to decode image data generated by the encoding method as claimed in claim 9.

13. A decoding apparatus comprising:
circuitry configured to decode image data generated by the image encoding apparatus as claimed in claim 1.

14. A decoding method comprising:
decoding image data generated by the encoding method as claimed in claim 9.

* * * * *